(12) United States Patent
Wiedemann et al.

(10) Patent No.: US 8,139,631 B2
(45) Date of Patent: Mar. 20, 2012

(54) METHOD FOR TRANSMITTING DATA

(75) Inventors: Stefan Wiedemann, Munich (DE);
Reinald Cronauer, Augsburg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1294 days.

(21) Appl. No.: 11/772,964

(22) Filed: Jul. 3, 2007

(65) Prior Publication Data

US 2008/0130762 A1   Jun. 5, 2008

(30) Foreign Application Priority Data

Jul. 6, 2006   (DE) .......................... 10 2006 031 230

(51) Int. Cl.
*H03K 7/08* (2006.01)

(52) U.S. Cl. ...................................................... 375/238
(58) Field of Classification Search .................. 375/238, 375/239, 295, 299, 354
See application file for complete search history.

(56) References Cited

U.S. PATENT DOCUMENTS

| 5,257,311 | A | * | 10/1993 | Naito et al. | .................. | 370/244 |
| 5,349,461 | A | | 9/1994 | Huynh et al. | | |
| 6,567,476 | B2 | | 5/2003 | Kohl et al. | | |
| 2002/0181050 | A1 | * | 12/2002 | Drost et al. | .................. | 359/152 |
| 2008/0198907 | A1 | * | 8/2008 | Breitfuss | ..................... | 375/219 |

FOREIGN PATENT DOCUMENTS

EP   0 693 409 A1   1/1996
WO   WO 03/056152 A1   7/2003

OTHER PUBLICATIONS

German Search Report dated Apr. 24, 2007 with English translation of relevant portion (Nine (9) pages).

* cited by examiner

*Primary Examiner* — Kevin Kim
(74) *Attorney, Agent, or Firm* — Crowell & Moring LLP

(57) ABSTRACT

In a method for transmitting data using a predetermined data protocol between a first electronic control unit and a second electronic control unit in a motor vehicle, in which a data protocol is transmitted in the form of a pulse-pause sequence via a single electrical line, a first data protocol may be output by the first control unit on the line and synchronously a second data protocol may be output by the second control unit on the line, after which at least one of the control units acquires the resulting signal of the data protocols on the line and checks it for predefined criteria.

16 Claims, 5 Drawing Sheets

METHOD FOR TRANSMITTING DATA

CROSS REFERENCE TO RELATED APPLICATIONS

This application claims priority under 35 U.S.C. §119 to German Patent Application No. 102006031230.9 filed Jul. 6, 2006, the entire disclosure of which is herein expressly incorporated by reference.

BACKGROUND AND SUMMARY OF THE INVENTION

The present invention relates to a method for transmitting data.

A data transmission method in a data processing system suitable for use in a motor vehicle, in which data is transmitted in accordance with a predetermined data protocol between a transmitter, which is part of a sensor unit, and a receiver, which is part of a central computing unit, is known from European patent document EP 0 693 409 A2. The predetermined data protocol includes a pulse-width modulated signal (PWM signal), which has a predetermined period duration, i.e., a predetermined interval between two sequential pulse-width modulated signals. The information is transmitted in the form of various widths of the pulses within a period duration. Error monitoring in regard to whether the transmitted signal has been impaired by an interference signal is executed by monitoring the period duration and, in the event of a deviation from the predetermined period duration, not classifying the corresponding signal as a perfectly transmitted signal.

It is an object of the present invention to improve the method of the type cited above in regard to a functional expansion when transmitting data protocols via only one serial interface, in particular in the form of an electrical line.

This and other objects and advantages are achieved by exemplary embodiments of a method for transmitting data according to the present invention.

A data bus connection typically used for data transmission and diagnostic purposes may be saved for other uses by the present invention. The data transmission via PWM signals is also less susceptible to interference.

Other objects, advantages and novel features of the present invention will become apparent from the following detailed description of the invention when considered in conjunction with the accompanying drawings.

DETAILED DESCRIPTION OF THE DRAWINGS

Figure 1:
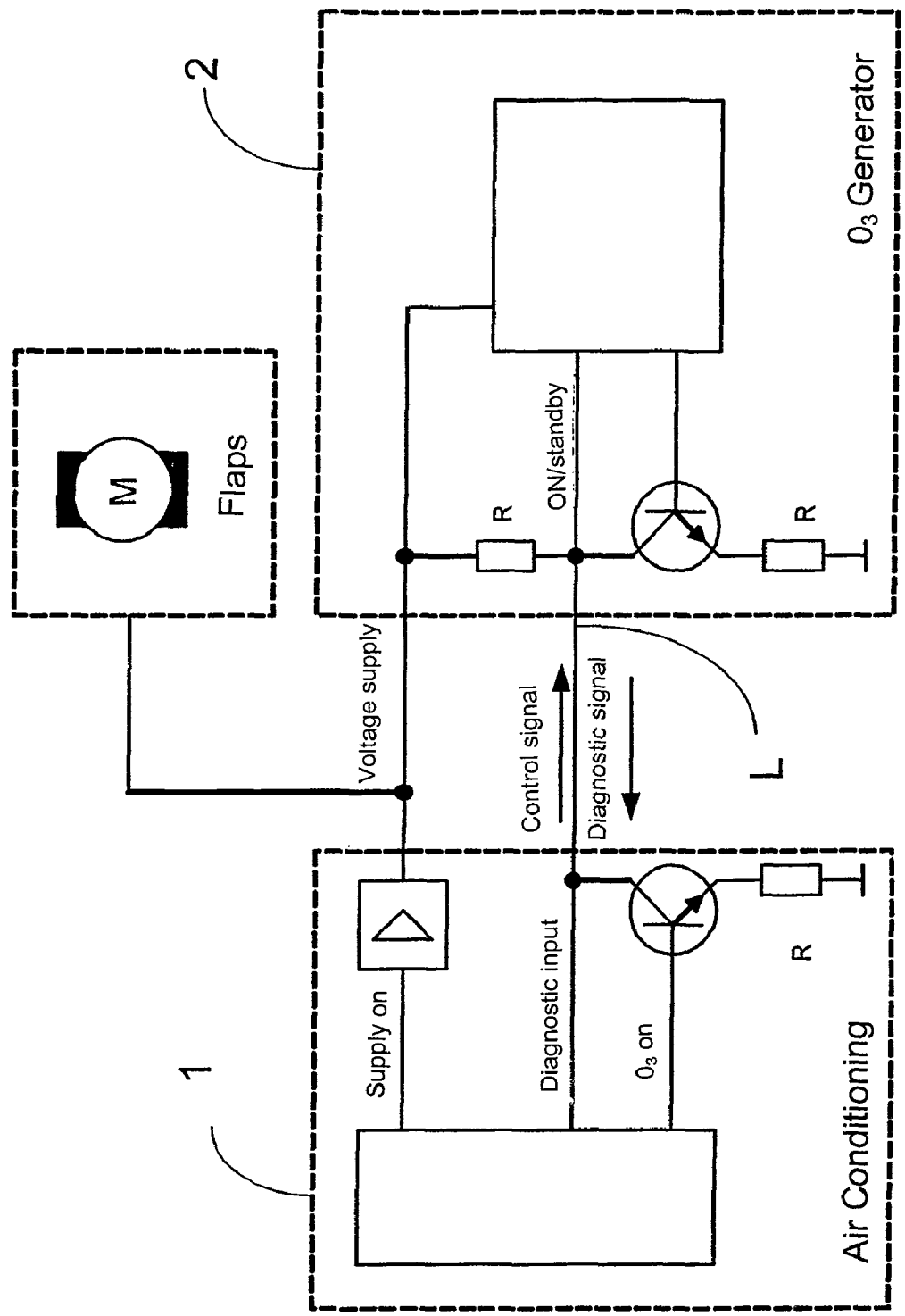
FIG. 1 shows a data composite signal for performing the method according to the present invention.

In FIG. 1, a first electronic control unit 1, in the form of a control unit for an air-conditioning system in the motor vehicle, is connected via a voltage supply line and via a signal line L to a second electronic control unit 2, in the form of an ozone generator for disinfecting the evaporator of the air-conditioning system. The air-conditioning control unit 1 controls flaps and other actuators belonging to the air-conditioning system in a known way as a function of various input signals.

Predetermined data protocols (D1 and D2, see FIGS. 2 through 5) are transmitted in the form of a periodically repeating pulse-pause sequence, which may be a pulse-width modulated signal, via the single electrical signal line L. In the present example, the data protocol D1 is the control signal for turning the ozone generator 2 on and off and the data protocol D2 is the diagnostic signal, via which the ozone generator 2 communicates to the air-conditioning control unit 1 whether, and possibly which, errors exist. The air-conditioning control unit 1 and the ozone generator 2 output their data protocols D1 and D2 synchronously in the settled state. Settled state means that both control units 1 and 2 are powered up, initialized, and synchronized. The air-conditioning control unit 1 acquires the resulting signal RS of the data protocols D1 and D2 on the signal line L via the diagnostic input and checks this resulting signal RS for predefined criteria, in particular as to whether the data protocol D2 reports an error.

Figure 3:
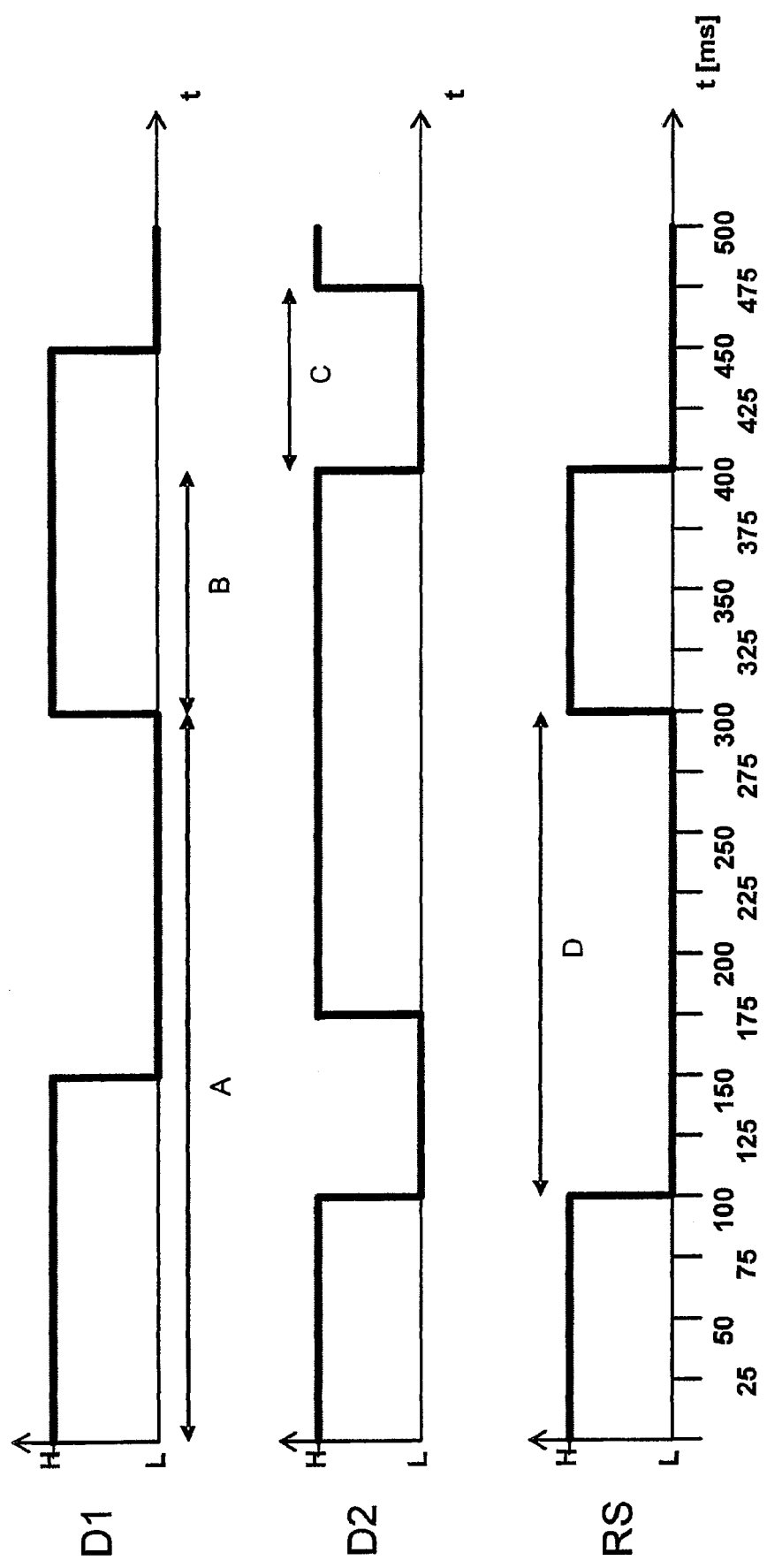
FIG. 3 shows the synchronous data protocols in the first operating mode, in which the second control unit reports an error.
Figure 4:
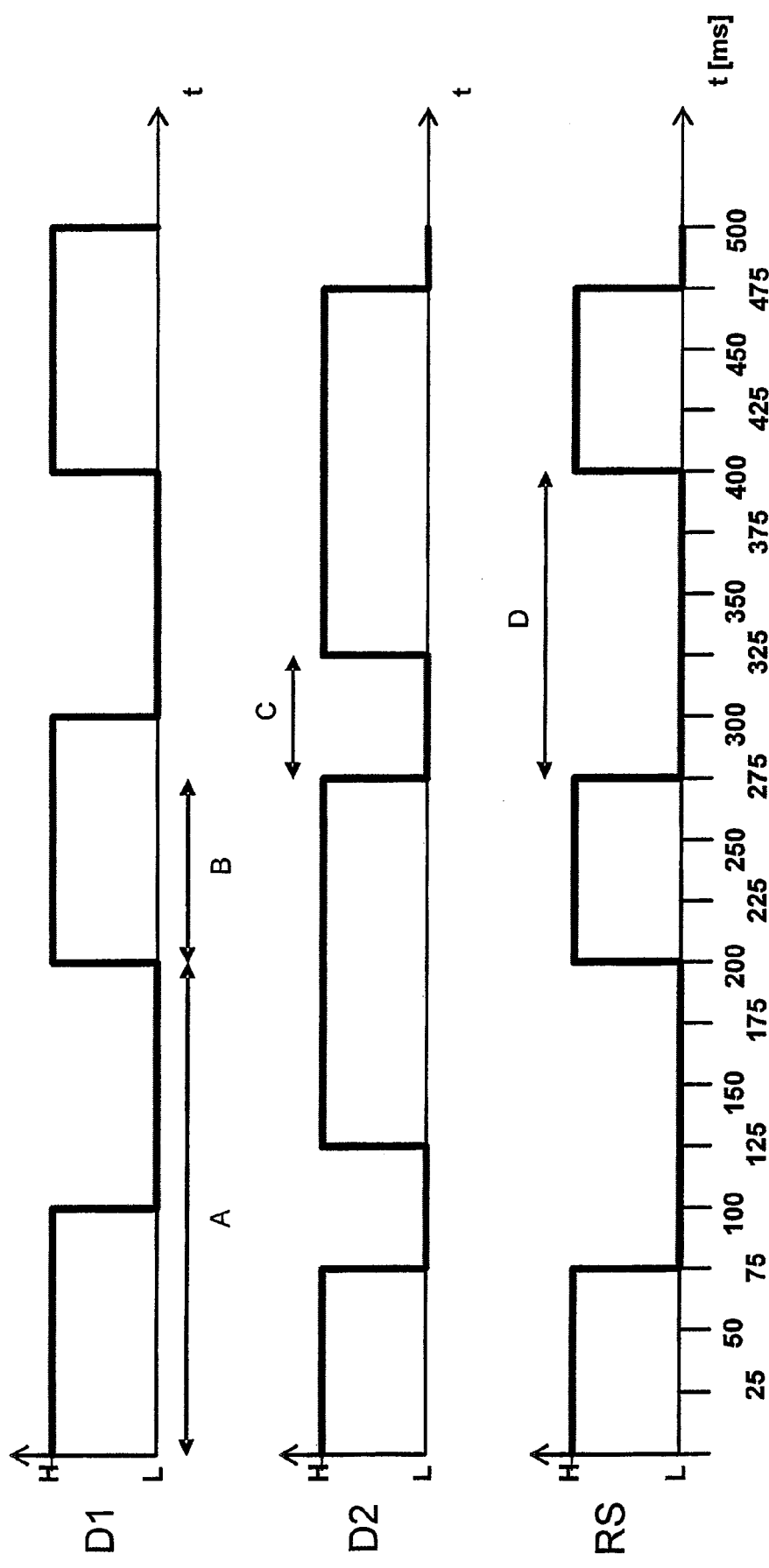
FIG. 4 shows the synchronous data protocols in a second error-free operating mode.
Figure 5:
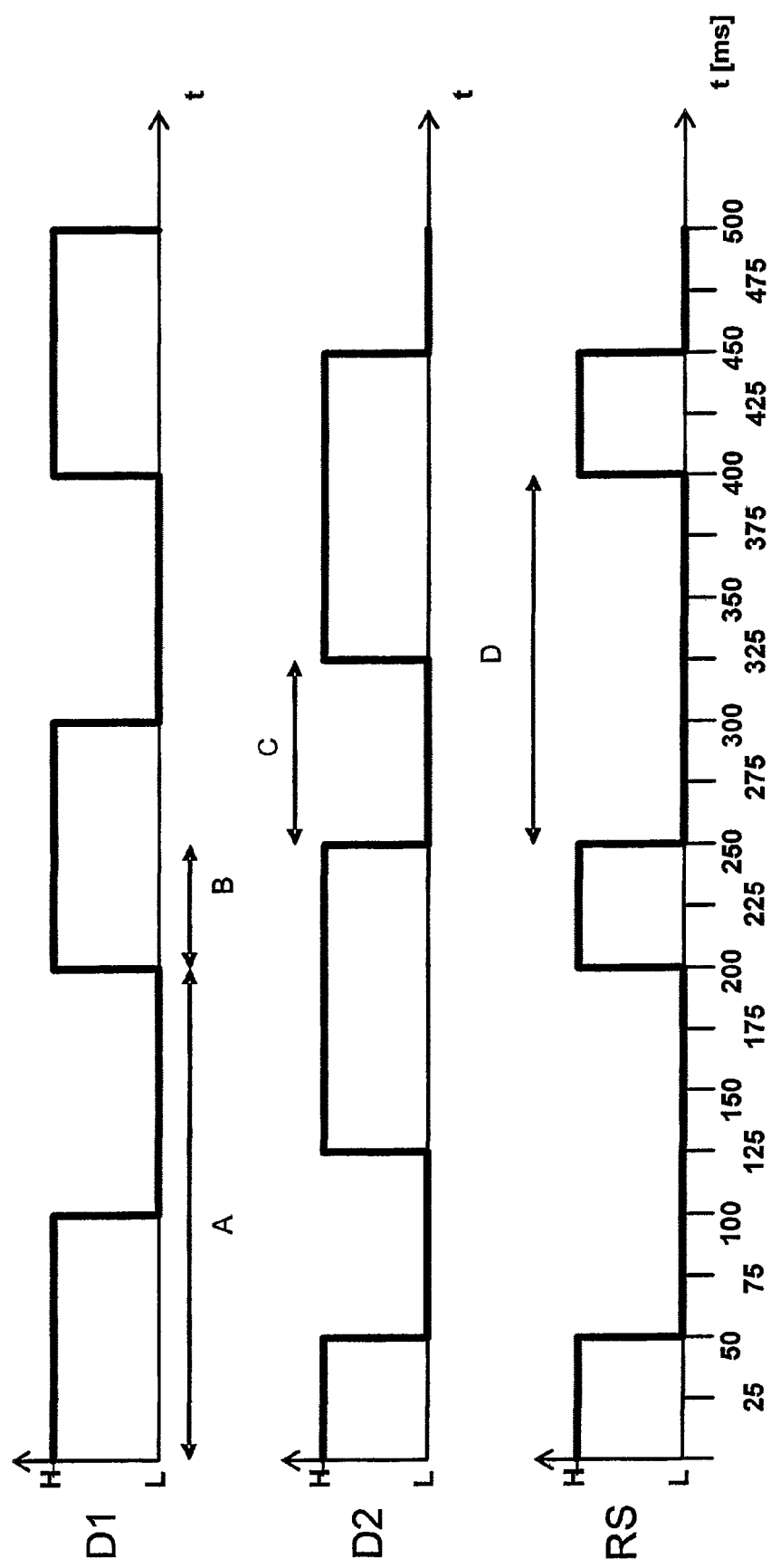
FIG. 5 shows the synchronous data protocols in the second operating mode, in which the second control unit reports an error.

The air-conditioning control unit 1 provides two specific data protocols D1 in the form of a defined, periodically repeating pulse-pause sequence, for example, a first data protocol having a period duration of 300 ms (see FIGS. 2 and 3) and a second data protocol having a period duration of 200 ms (see FIGS. 4 and 5). The ozone generator 2 synchronizes itself after recognizing this period duration using its data protocol D2, also in the form of a defined, periodically repeating pulse-pause sequence, at the same period duration of 300 ms or 200 ms. FIGS. 2 through 5 show the settled state.

The data protocols D1 and D2 of the two control units 1 and 2 differ in their pulse-pause sequence. The second control unit 2 outputs a different pulse-pause sequence in case of error than in the error-free case. For example, the pulse-width modulated signal shown in FIG. 3 (error case) of the data protocol D2 therefore has a different pulse/pause ratio than the pulse-width modulated signal of the data protocol D2 in FIG. 2 (error-free case). This may also be seen in FIGS. 4 and 5.

Figure 2:
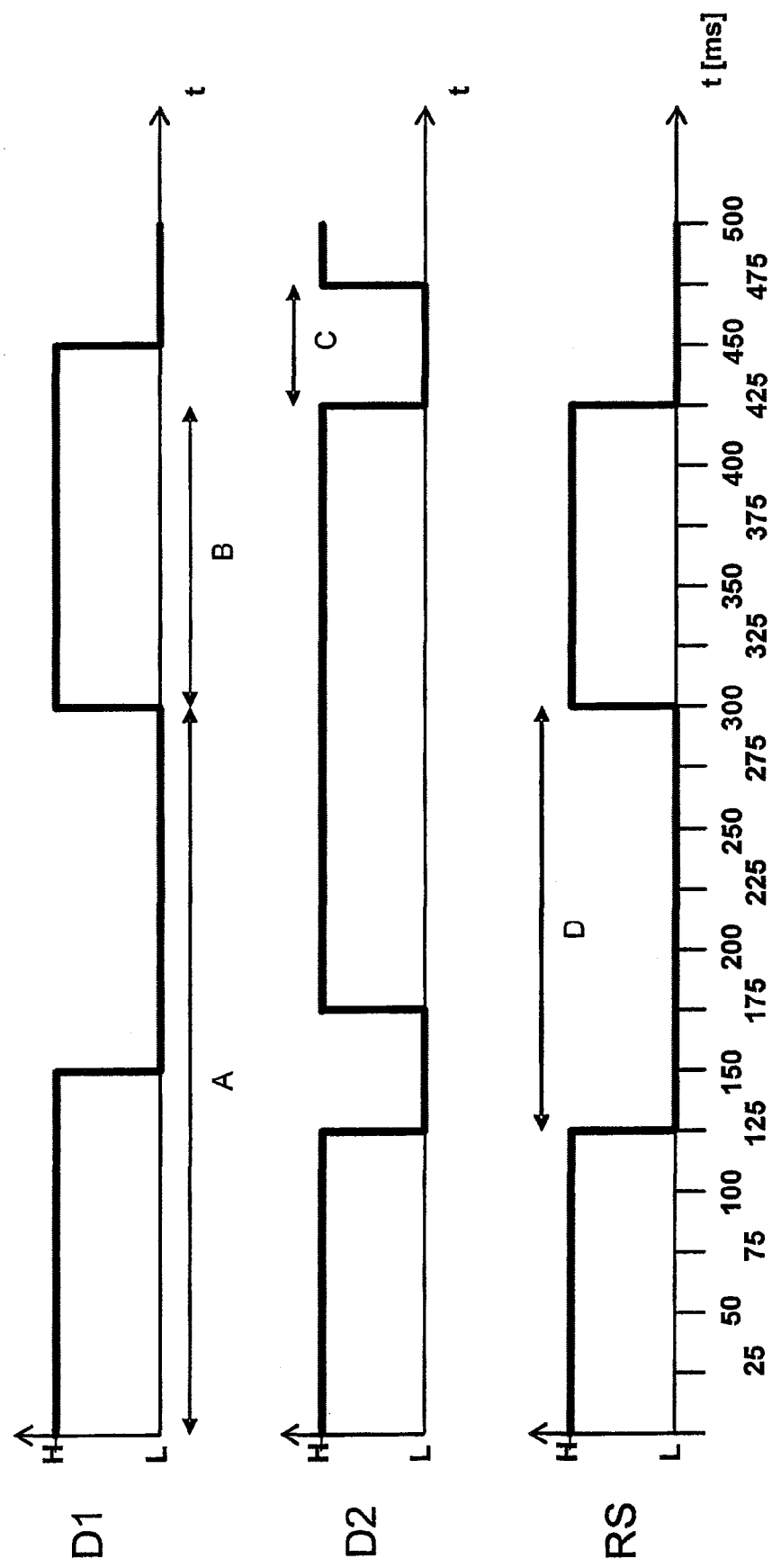
FIG. 2 shows the synchronous data protocols in a first error-free operating mode.

The data protocol D1 having a period duration of 300 ms, as shown in FIG. 2, is assigned to a first operating mode "standby—ozone off". The data protocol D1 having a period duration of 200 ms, as shown in FIG. 4, is assigned to a second operating mode "ozone on". FIGS. 2 and 4 each show the particular synchronous data protocol D2 as a diagnostic signal for error-free operation. FIGS. 3 and 5 show the particular synchronous data protocol D2 as a diagnostic signal for operation in case of error.

The air-conditioning control unit 1 acquires the resulting signal RS which results from the superposition of the data protocols D1 and D2 on the single line L via the diagnostic input. From the resulting signal RS, the air-conditioning control unit 1 recognizes both the period duration of the data protocols D1 and D2 and also the different pulse/pause ratios, to check whether the ozone generator 2 reports an error. Simultaneously, the air-conditioning control unit 1 also recognizes errors on the line if the resulting signal RS no longer reports a change from high to low and vice versa. Corresponding emergency programs are activated as a function of the recognized error signals.

Supplementary signal tables to FIGS. 2 through 5 as examples for predefined pulse-pause sequences in regard to the data protocols D1 and D2:

FIG. 2:
A period duration 300 ms for operating mode "standby—ozone off"
B waiting time 125 ms after rising flank of D1 for changeover to low in the data protocol D2
C duration of the low signal in the data protocol D2 in error-free operation 50 ms here
D control unit 1 recognizes 175 ms long low signal from resulting signal RS FIG. 3:
A period duration 300 ms for operating mode "standby—ozone off"
B waiting time 100 ms after rising flank of D1 for changeover to low in the data protocol D2
C duration of the low signal in the data protocol D2 in error-free operation 75 ms here
D control unit 1 recognizes 200 ms long low signal from resulting signal RS FIG. 4:
A period duration 200 ms for operating mode "ozone on"
B waiting time 75 ms after rising flank of D1 for changeover to low in the data protocol D2
C duration of the low signal in the data protocol D2 in error-free operation 50 ms here
D control unit 1 recognizes 125 ms long low signal from resulting signal RS FIG. 5:
A period duration 200 ms for operating mode "ozone on"
B waiting time 50 ms after rising flank of D1 for changeover to low in the data protocol D2
C duration of the low signal in the data protocol D2 in error-free operation 75 ms here
D control unit 1 recognizes 150 ms long low signal from resulting signal RS The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for transmitting data using a predetermined data protocol between a first electronic control unit and a second electronic control unit in a motor vehicle, in which the predetermined data protocol in the form of a pulse-pause sequence is transmitted via a single electrical line, wherein a first data protocol may be output on the line by the first control unit and synchronously a second data protocol may be output by the second control unit on the line, and at least one of the control units acquires a resulting signal of the first and second data protocols on the line and checks the resulting signal for predefined criteria, wherein a predefined criterion for checking the resulting signal may be the recognition of a specific error.

2. A method for transmitting data using a predetermined data protocol between a first electronic control unit and a second electronic control unit in a motor vehicle, in which the predetermined data protocol in the form of a pulse-pause sequence is transmitted via a single electrical line, wherein a first data protocol may be output on the line by the first control unit and synchronously a second data protocol may be output by the second control unit on the line, and at least one of the control units acquires a resulting signal of the first and second data protocols on the line and checks the resulting signal for predefined criteria, wherein the first control unit predefines the first data protocol in the form of a defined, periodically repeating pulse-pause sequence having a predefined period duration, after which the second control unit, after recognizing the predefined period duration, synchronizes the second data protocol in the form of a defined, periodically repeating pulse-pause sequence to the predefined period duration.

3. The method according to claim 1, wherein the first and second data protocols of the first and second control units differ in their pulse-pause sequence.

4. The method according to claim 1, wherein at least one control unit outputs a different pulse-pause sequence in case of error than in the error-free case.

5. The method according to claim 1, wherein different data protocols of at least one control unit are assigned to different operating modes, these data protocols being able to differ in at least one of the pulse-pause sequence and the period duration.

6. The method according to claim 2, wherein the first and second data protocols of the first and second control units differ in their pulse-pause sequence.

7. The method according to claim 2, wherein at least one control unit outputs a different pulse-pause sequence in case of error than in the error-free case.

8. The method according to claim 3, wherein at least one control unit outputs a different pulse-pause sequence in case of error than in the error-free case.

9. The method according to claim 2, wherein different data protocols of at least one control unit are assigned to different operating modes, these data protocols being able to differ in at least one of the pulse-pause sequence and the period duration.

10. The method according to claim 3, wherein different data protocols of at least one control unit are assigned to different operating modes, these data protocols being able to differ in at least one of the pulse-pause sequence and the period duration.

11. The method according to claim 4, wherein different data protocols of at least one control unit are assigned to different operating modes, these data protocols being able to differ in at least one of the pulse-pause sequence and the period duration.

12. The method according to claim 2, wherein a predefined criterion for checking the resulting signal may be the recognition of a specific error.

13. A computer readable medium encoded with a program for executing a method according to claim 1 execution in a correspondingly programmed control unit.

14. A data connection system having a first control unit and a second control unit, and having a communication link in the form of an electric line between the first control unit and the second control unit, both control units transmitting data protocols via the communication link according to a method according to claim 1.

15. A data connection system comprising:
a first control unit;
a second control unit;
a communication link in the form of an electric line between the first and second control units;
wherein the first and second units synchronously transmit first and second data protocols, respectively via the communication link and at least one of the first and second control units acquires a resulting signal of the first and second protocols and checks the resulting signal for predefined criteria, wherein a predefined criterion for checking the resulting signal may be the recognition of a specific error.

16. A method for transmitting data using a predetermined data position between a first electronic control and a second electronic control unit in a motor vehicle, the method comprising the acts of:

transmitting, via a single electrical line, the predetermined data protocol in the form of a pulse-pause sequence;

synchronously outputting a first data protocol on the electrical line by the first control unit and a second data protocol on the electrical line by the second control unit;

acquiring a resulting signal of the first and second data protocols on the electrical line; and checking the resulting signal for predefined criteria, wherein a predefined criterion for checking the resulting signal may be the recognition of a specific error.

* * * * *